(12) United States Patent
Spacek

(10) Patent No.: US 8,474,580 B2
(45) Date of Patent: Jul. 2, 2013

(54) FLOATING BRAKE DISC

(76) Inventor: Stanislav Spacek, Holice (CZ)

( * ) Notice: Subject to any disclaimer, the term of this patent is extended or adjusted under 35 U.S.C. 154(b) by 377 days.

(21) Appl. No.: 12/548,905

(22) Filed: Aug. 27, 2009

(65) Prior Publication Data

US 2010/0051398 A1 Mar. 4, 2010

(30) Foreign Application Priority Data

Aug. 29, 2008 (EP) .................. 08163254

(51) Int. Cl.
 *F16D 65/12* (2006.01)
(52) U.S. Cl.
 USPC ............ 188/218 XL; 188/18 A; 188/26; 188/264 A; 188/264 R
(58) Field of Classification Search
 USPC .................... 188/218 XL, 264 R
 IPC ............................. F16D 65/12
 See application file for complete search history.

(56) References Cited

U.S. PATENT DOCUMENTS

| | | | |
|---|---|---|---|
| 6,957,726 B2 | 10/2005 | Gehrs | |
| 7,284,643 B1* | 10/2007 | Kao | 188/218 XL |
| 7,810,615 B2 | 10/2010 | Künstle et al. | |
| 2005/0082125 A1* | 4/2005 | Gehrs | 188/218 XL |
| 2005/0161296 A1* | 7/2005 | Okabe | 188/218 XL |
| 2007/0102247 A1* | 5/2007 | Takenaka et al. | 188/26 |

FOREIGN PATENT DOCUMENTS

| | | |
|---|---|---|
| DE | 197 26 674 A1 | 1/1998 |
| DE | 10 2004 002 710 A1 | 8/2005 |

* cited by examiner

*Primary Examiner* — Robert A Siconolfi
*Assistant Examiner* — San Aung
(74) *Attorney, Agent, or Firm* — Bateman IP

(57) ABSTRACT

The invention relates to a floating brake disc (1), particularly for a motorcycle, particularly an off-road motorcycle, which comprises an outer ring (2) which carries a brake band (23) and an inner ring (3) via which the brake disc (1) is connected to a wheel of the vehicle. According to the invention, at least one region (5) of contact, in particular a number of regions (5) of contact, between the outer ring (2) and the inner ring (3) is/are formed on a circular arc (6) extending, concentrically with the brake disc (1), between the outer ring (2) and the inner ring (3), the outer ring (2) and inner ring (3) being connected to one another in the at least one contact region (5) with at least one connecting means (16), in particular a rivet. The inner ring (3) also has, next to the at least one contact region (5), a projection (7) which engages in an indentation (8) in the outer ring (2) in such a way that a bearing surface (9) between the inner ring (3) and the outer ring (2) can be formed, at least when the brake disc (1) is in operation in a vehicle, particularly a motorcycle.

14 Claims, 1 Drawing Sheet

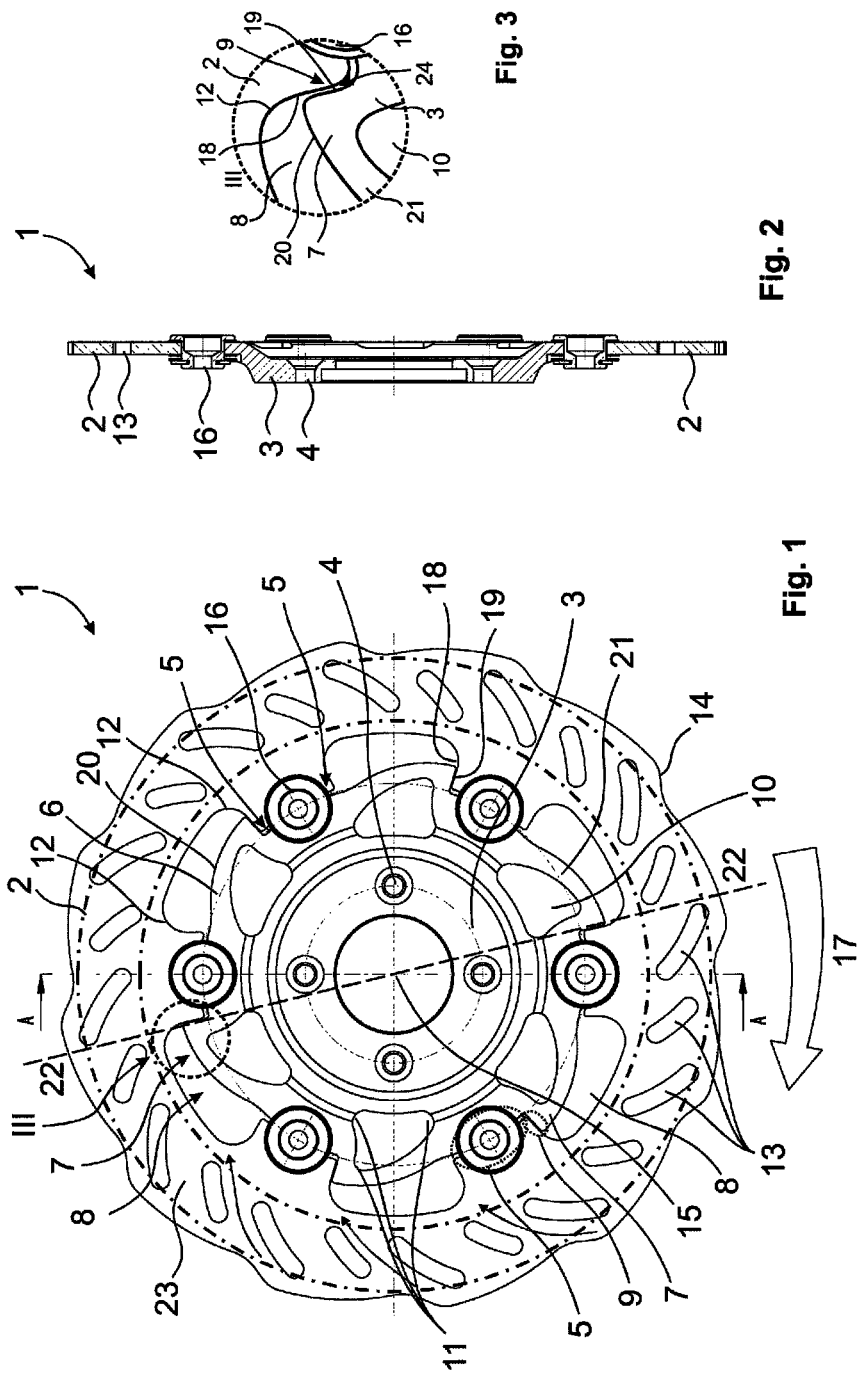

FLOATING BRAKE DISC

PRIORITY

The present application claims the benefit of EP 08163254.9, filed Aug. 29, 2008, which is herein incorporated by reference in its entirety.

THE FIELD OF THE INVENTION

The present invention relates to a floating brake disc, particularly for a motorcycle.

BACKGROUND

The term "floating brake disc" describes a two-part brake disc. A floating brake disc consists of an inner ring and an outer ring, which are coupled to one another via connecting means. The inner ring is also described as a "carrier pot", and the outer ring as a "braking rim" or as a "rotor". The outer ring carries the brake band, that is to say, the brake linings run on said ring. Coupling to the wheel takes place via the inner ring. Floating brake discs were developed in order to avoid overheating problems in one-piece brake discs. A problem with regard to the durability of floating brake discs is constituted by the connecting means, which are acted upon by powerful forces during the braking operation, so that it is possible, in some cases, for shearing-off of the connecting means, and thereby breakage of the brake disc, to occur. In any case, the connecting means are exposed to wear and tear.

One proposal for improving the above-mentioned problems of floating brake discs is put forward by U.S. Pat. No. 6,957,726 B2. In the exemplified embodiments described in that patent, the torque is shifted from the rotor to the hub. The load is thereby removed from the connecting means and borne by special tooth systems.

The brake disc according to the aforesaid US patent has various disadvantages. Thus, manufacture is very expensive since the sections of toothing have to be manufactured accurately in order to make the desired meshing, and the relieving of the load on the connecting means, possible at all. The constant subjection of the bearing surface to load in the region of the toothing between the inner and outer rings results in a relatively high degree of wear.

SUMMARY OF THE INVENTION

The object of the invention is therefore to provide a brake disc which avoids the disadvantages that are known from the US patent. The intention is, in particular, to simplify manufacture and to improve the wearing of the brake disc.

This object is achieved by means of a floating brake disc according to the present invention.

The brake disc according to the invention is intended, above all, for motorcycles, particularly for off-road motorcycles which are also described as "motocross motorcycles" or "all-terrain motorcycles". However, it can also be used in other vehicles such as, for example, cars, lorries, bicycles, aircraft, etc. According to its type, the floating brake disc comprises an outer ring which carries the brake band and an inner ring via which the brake disc is connected to a wheel. According to the invention, a region of contact between the outer ring and the inner ring is formed on a circular arc extending, concentrically with the brake disc, between the outer ring and the inner ring. In this contact region, the outer ring and the inner ring are connected to another via at least one connecting means, in particular a rivet. Next to this contact region, the inner ring has a projection which engages in an indentation in the outer ring in such a way that a bearing surface between the inner ring and the outer ring can be formed, at least when the brake disc is in operation, for example in the motorcycle. In other words, this means that, in addition to the contact region and therefore in addition to the connecting means, the inner ring and outer ring can engage in one another via the projection and the corresponding indentation. The projection on the inner ring and the corresponding indentation in the outer ring come into contact, at least during the braking operation of the vehicle, particularly the motorcycle, and thus bring about a brief frictional contact connection between the inner ring and the outer ring via the bearing surface established.

The advantage of the invention is that the transmission of force is apportioned to the connecting means and to the bearing surface which is established by the projection and the indentation. The forces that occur when the brake disc is in operation are distributed both via the connecting means and via the bearing surface established by the projection and the indentation. This has the advantage that manufacture needs to take place, otherwise than is the case in U.S. Pat. No. 6,957,726 B2, in a far less precise manner and that, as a result of the additional load-bearing of the connecting means, the wearing of the brake disc as a whole is reduced.

In one preferred embodiment, there is a clearance between the projection and the indentation, so that the outer ring and inner ring do not constantly bear against one another in this region, but the bearing surface is formed only as a result of relative movement of the inner ring and outer ring. This means that the bearing surface is formed only when the inner ring and outer ring move relative to one another. This is the case, for example, during the decelerating operation or as a result of a gyratory transverse movement.

In the course of unbraked operation, it is preferable if the bearing surface between the projection and the indentation is not formed, if the at least one connecting means merely trails. This means that, in the unbraked condition, all transmissions of force take place via the connecting means. During the braking operation, however, in which particularly high forces occur, the bearing surface between the inner ring and the outer ring is formed, and a frictional contact connection occurs between the said parts. The forces in the braking operation are thereby apportioned to the connecting means and the bearing surface. As a result of this measure, the connecting means may be of less robust design than in the case of ordinary floating brake discs belonging to the prior art.

According to one preferred embodiment, the shape of the projection may be described as being in the form of a nose or beak. The projection on the inner ring preferably extends radially at the point where it encounters the indentation in the outer ring. This means that one side or edge of the projection on the inner ring is of radial construction. In this connection, "radial" is understood to mean that the edge of the projection lies on a radius of the brake disc as a whole or of the inner ring, or on a prolongation of the radius of said inner ring. As a result of this measure, a radial bearing surface between the inner ring and the outer ring is formed. According to another preferred embodiment, the rotor has, in the region of the projection, at least one perforation, which could also be described as a "hole". The said perforation is, in particular, wedge-shaped, and can also be described as "triangular", one side of the said triangle or wedge extending, in particular, parallel to the edge of the projection which forms, together with the corresponding region of the indentation in the outer ring, the bearing surface according to the invention. The perforations follow the shape of the projection. The corners of the perforations are preferably rounded. This formation according to the invention brings about an improved flow of force within the inner ring. The forces acting upon the projection, and therefore upon the inner ring, after the forming of the bearing surface, for example during the braking operation, are conducted into the inner ring in such a way, as a result of the preferred configuration of the perforations, that the most favourable possible distribution of the forces that occur can take place.

According to another preferred embodiment, the corners of the indentation, which is constructed in the outer ring, are rounded. As a result of this measure, the flow of force within the brake disc, or more precisely within the outer ring of said brake disc, is further improved.

These and other aspects of the present invention are realized in a brake disc as shown and described in the following figures and related description.

BRIEF DESCRIPTION OF THE DRAWINGS

The invention will be explained and described in greater detail below with the aid of the drawings, in which:

FIG. 1 shows a brake disc according to the invention, in a diagrammatic representation;

FIG. 2 shows a section along the line A-A in FIG. 1; and

FIG. 3 shows the detail III from FIG. 1, in an enlarged representation.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

A floating brake disc 1 according to the invention is represented in FIGS. 1 and 2, whereas FIG. 3 shows the detail III in enlarged form. The brake disc represented is preferably intended for use in a motorcycle. It has an inner ring 3 and an outer ring 2. Located on the outer ring is the brake band 23, that is to say the region on which the brake pad of the vehicle's brake runs. The brake band is indicated in chain-dotted lines in the representation. Provided in the centre of the inner ring 3 are bores 4, via which coupling to a wheel of the vehicle takes place with the aid of fastening means (not represented).

According to the invention, a contact region 5 is provided on a circular arc 6 (represented in broken lines) between the inner ring 3 and the outer ring 2. The circular arc 6 extends concentrically with the brake disc 1, which means that the central point of the circular arc 6 and the central point of the brake disc 1 coincide. This central point is designated by the reference numeral 15. It can further be seen that it is not only the circular arc 6 that extends concentrically with the brake disc 1, but that said brake disc 1, the outer ring 2 and the inner ring 3 are of concentric construction in each case. In the contact region 5, the outer ring 2 and the inner ring 3 impinge upon one another. What is essential is the shape of the contact region, which follows the circular arc 6. Said contact region consequently does not have the shape of a straight line, but is arcuate with an angle which is determined in accordance with the circular arc on which the contact surface extends. In the contact region 5, the inner ring 2 and outer ring 3 are connected to one another via connecting means 16. Mention may be made of a rivet as a preferred example of a connecting means 16 of this kind.

The brake disc 1 preferably has a number of contact regions 5 which are, in particular, evenly distributed. In the representation in FIG. 1, six such contact regions are provided. However, it is also possible to provide fewer or more contact regions of this kind, for example four, five, seven or eight. There may also be still more or still fewer than the four to eight described. These are preferably evenly distributed. At least one connecting means 16 is provided per contact region 5. It is also possible to provide a number of connecting means, for example two connecting means 16, per contact region 5.

According to the invention, a projection 7 is provided on the inner ring 3, next to the contact region 5. It can be seen, from the representation in FIG. 1, what is meant by the term "next to the contact region". If one moves on ahead on the circular arc 6 in the direction of rotation, which is represented by the arrow 17, one first of all encounters the projection 7 and then passes directly onwards to the contact region 5. Viewed in plan view, as represented in FIG. 1, the projection 7 lies to the left of the contact region 5 and therefore to the left of the connecting means 16. It is located, so to speak, to the side against the direction of rotation of the brake disc 1.

An indentation 8 in the outer ring 2 is configured in a manner corresponding to the projection 7. Said indentation may also be described as a "clearance". A bearing surface 9 is formed as a result of the corresponding configuration. As has already been explained at the beginning, the formation of this bearing surface and therefore the frictional contact connection between the outer ring 2 and the inner ring 3 occurs at least during the braking operation.

The indentation 8 has rounded corners 12. According to the invention, the edge 18 of the indentation 8, which lies opposite the edge 19 of the projection 7, extends in a straight manner. In the embodiment in FIG. 1, the indentation 8 is symmetrical in shape. The projection 7 is not. The latter has the shape of a beak, which may also be described as the shape of a nose. This means that the first edge 19, which faces towards the edge 18 of the indentation 8 and combines with it to form the bearing surface 9, forms a right angle or an acute angle in relation to the second edge 20, which lies next to it, of the projection 7. Said second edge 20 falls away towards the circular arc 6, so as to then extend with the latter in the contact region 5. The inner ring 3 has a perforation 10. Said perforation 10 extends right into the projection 7. Its shape may be described as being in the form of a wedge or even as triangular. The corners 11 of the perforation 10 are preferably rounded. The shape of the perforation 10 follows that of the projection 7. Its function lies in the optimised conducting-away of forces, starting out from the bearing surface 9, via the first edge 19 of the projection 7 and the web 21 formed by the perforation 10, as far as the interior of the inner ring 3.

Openings, in particular slots 13, are preferably constructed in the region of the brake band. They are configured in such a way that the forces which occur, above all, during the braking operation, are directed towards the inner ring 3. In addition, they look after the heat-dissipating function. In the embodiment represented, the outer contour 14 of the brake disc 1 is not circular, but in a shape that differs therefrom, namely undulatory.

The bearing surface 9, and therefore the first edge 19 and the edge 18, are oriented radially. What is meant by "radially" is that they lie on a radius of the brake disc 1. This radius is indicated by a broken line 22 and is prolonged in order to represent it more clearly.

In the enlarged representation in FIG. 3, the clearance 24, in particular, can be clearly seen. A certain intervening space, which is described as a "clearance", is left between the edge 19 of the projection 7 and the edge 18 of the indentation 8. In the unbraked condition (which is represented in FIG. 3), the projection 7 and the indentation 8 do not touch each another; the connecting means 16 merely trails. During the decelerating operation, a relative movement between the inner ring 3 and the outer ring 2 occurs, as a result of which the edge 19 is pressed onto the edge 18 and a bearing surface 9 between said inner ring 3 and outer ring 2 is thus formed. Forces are transmitted as a result of the frictional contact connection between the outer ring and the inner ring, and both the connecting means 16 and the bearing surface 9 trail in this condition. The connecting means 16 is relieved of load.

A list of reference numerals is provided to aid in understanding the present invention.

LIST OF REFERENCE NUMERALS 1 brake disc
2 outer ring
3 inner ring
4 bore
5 contact region
6 circular arc
7 projection
8 indentation
9 bearing surface
10 perforation
11 corner of perforation
12 corner of indentation
13 slot
14 outer contour
15 central point
16 connecting means
17 arrow
18 edge of indentation
19 first edge of projection
20 second edge of projection
21 web
22 radius
23 brake band
24 clearance There is thus disclosed an improved brake disc. It will be appreciated that numerous changes may be made to the present invention without departing from the scope of the claims.

What is claimed is:

1. A floating brake disc comprising:
an outer ring having a brake band; and
an inner ring via which the floating brake disc is to be connected to a wheel of a vehicle, wherein:
said outer ring and said inner ring have a number of contact regions between the outer ring and the inner ring;
the contact region is formed on a circular arc extending between the outer ring and the inner ring such that said contact region follows said circular arc;
the contact regions are arranged concentrically with the floating brake disc;
the outer ring and the inner ring are connected to one another in the contact regions;
the contact regions have at least one connecting means, in particular a rivet;
the outer ring has an indentation;
and next to the at least one contact region the inner ring has a projection which engages in said indentation in the outer ring in such a way that a bearing surface between the inner ring and the outer ring is formed, at least at times when the brake disc is in operation in said vehicle;
wherein there is a clearance between the projection and the indentation, the clearance being formed such that there is no substantial contact between the projection and the indentation until the bearing surface is formed by a relative movement, during a braking operation, between the inner ring and the outer ring
and wherein during an unbraked operation of the vehicle the bearing surface is not formed and substantially all force transmitted to the outer ring from the inner ring is transferred via the at least one connecting mean.

2. The floating brake disc according to claim 1 wherein:
the projection has an edge; and
the indentation has an edge;
the edge of the projection on the inner ring extends radially and the edge of the indentation in the outer ring is configured in a corresponding manner to the edge of the projection, so that a radial bearing surface between the inner ring and the outer ring is being formed.

3. The floating brake disc according to claim 1, in which the inner ring has, in the region of the projection, perforations which follow a shape of the projection.

4. The floating brake disc according to claim 1 in which a number of contact regions are formed which are distributed evenly over the circular arc.

5. The floating brake disc according to claim 1 in which on the outer ring there are openings which are constructed in such a way that force is conducted towards the inner ring during the braking operation.

6. The floating brake disc according to claim 1 in which the floating brake disc has an outer contour which deviates from a second concentric circular arc.

7. The floating brake disc according to claim 1 in which the outer ring, the inner ring and the contact region are concentric.

8. The floating brake disc according to claim 3 in which the perforations are wedge-shaped perforations.

9. The floating brake disc according to claim 1 in which the perforations have corners, said corners being rounded.

10. The floating brake disc according to claim 5 in which slots and/or hole-like openings are placed in the brake band of the outer ring.

11. The floating brake disc according to claim 6 in which the outer contour is an undulatory outer contour.

12. A floating brake disc comprising:
an outer brake disc ring having a brake band for contacting brake pads;
an inner ring via which the outer brake band is connected to the wheel of a vehicle;
a plurality of contact regions between the outer ring and the inner ring for attaching the outer ring to the inner ring, each of the contact regions comprising:
on the inner ring:
a circular arc segment which is concentric to the inner ring and a projection extending adjacent the arc segment in a radial direction; and
on the outer ring:
a circular arc segment which is concentric to the inner ring and a projection extending adjacent the arc segment in a radial direction so as to be complementary to the contact region on the inner ring; and a fastener disposed in the contact region to attach the inner ring to the outer ring;

wherein there is a clearance between the inner ring and outer ring such that braking force pushes the inner ring projection and outer ring projection against each other.

13. The floating disc of claim 12, wherein, for each of the inner ring contact regions, the projection extends radially outwardly from the arc segment.

14. The floating disc of claim 12, wherein the fastener is disposed between the inner ring and outer ring in the contact region and is disposed in a direction parallel to the axis of the brake disc to hold the inner ring and outer ring in a generally planar arrangement.

* * * * *